United States Patent [19]

Kawabata et al.

[11] Patent Number: 4,734,470

[45] Date of Patent: Mar. 29, 1988

[54] BLOCK COPOLYMER AND COMPOSITIONS

[75] Inventors: Juheiji Kawabata; Toshinori Sugie, both of Takaishi; Fumihiro Kobata, Izumi; Hitoshi Izutsu, Osaka; Manabu Chiba, Izumi-ohtsu, all of Japan

[73] Assignee: Dainippon Ink and Chemicals, Inc., Tokyo, Japan

[21] Appl. No.: 929,372

[22] Filed: Nov. 12, 1986

[30] Foreign Application Priority Data

Nov. 13, 1985 [JP] Japan ................................. 60-252857
Mar. 5, 1986 [JP] Japan ................................. 61-48110
May 30, 1986 [JP] Japan ................................. 61-125232

[51] Int. Cl.$^4$ ............................................. C08G 75/14
[52] U.S. Cl. ................................. 525/537; 525/536; 525/906; 528/388
[58] Field of Search ................. 525/536, 537, 906; 528/388

[56] References Cited

U.S. PATENT DOCUMENTS 4,127,713 11/1978 Campbell ........................... 528/388
4,654,410 3/1987 Kashiwame et al. ............... 525/537

FOREIGN PATENT DOCUMENTS 98362 6/1983 Japan ................................. 525/537
213758 12/1984 Japan ................................. 525/537

*Primary Examiner*—John C. Bleutge
*Assistant Examiner*—David W. Woodward
*Attorney, Agent, or Firm*—Sherman and Shalloway

[57] ABSTRACT

A block copolymer composed of polyphenylene sulfide segments and aromatic sulfide sulfone polymer segments and having a logarithmic viscosity [$\eta$], determined at 206° C. for its solution in alpha-chloronaphthalene in a polymer concentration of 0.4 g/100 ml of solution and calculated in accordance with the equation [$\eta$]=ln (relative viscosity)/polymer concentration, of 0.03 to 1.0. A resin composition comprising the block copolymer and polyphenylene sulfide and/or an aromatic sulfide sulfone polymer and optionally a filler. The block copolymer and the resin composition have improved mechanical strength and are suitable, for example, for encapsulation of electronic component parts.

6 Claims, 1 Drawing Figure

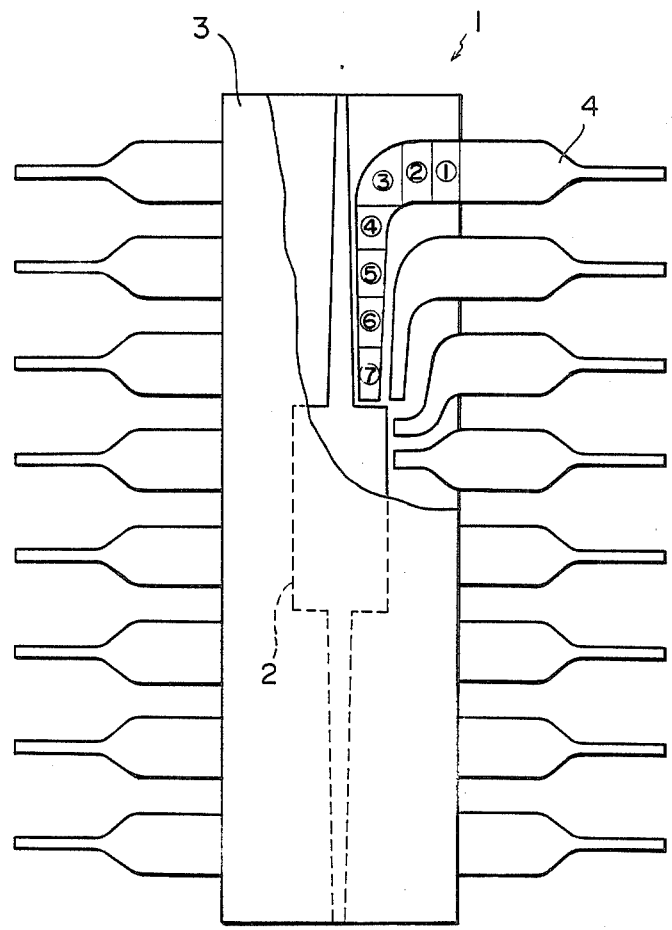

BLOCK COPOLYMER AND COMPOSITIONS

This invention relates to a block copolymer composed of polyphenylene sulfide (to be abbreviated as PPS hereinafter) segments and aromatic sulfide sulfone polymer segments, and a composition comprising it. More specifically, this invention relates to a block copolymer which is obtained by chemically bonding an aromatic sulfide sulfone polymer as soft segments to PPS, has an improvement in mechanical properties having to do with toughness, such as impact strength and pliability and can be used in various molding materials.

PPS has attracted attention as high performance engineering plastics having outstanding heat resistance, chemical resistance and rigidity over ordinary engineering plastics such as nylon, polycarbonate, polybutylene terephthalate and polyacetal. The PPS resin, however, has the serious defect that it has low toughness and is fragile as compared with the ordinary engineering plastics. In recent years, linear PPS different from the conventional heat-crosslinked PPS has been developed, but in the crystallized state, it has poor toughness characteristics such as low impact strength and elongation.

In order to improve the impact strength of PPS, it has been the previous practice to incorporate a filler such as glass fibers. But since this does not bring about a sufficient result, it is not effective for the prevention of cracking owing to molding shrinkage strains.

On the other hand, preparation of a polymer blend of PPS with a flexible polymer is an effective method. But since there are few polymers which are flexible and have excellent heat resistance and chemical resistance or the compatibility of the flexible polymer with PPS is insufficient, problems arise such as the reduction of mechanical strength (flexural strength, etc.) and the deterioration of the surface condition of the molded articles. No PPS has yet been obtained which has improved impact strength and flexibility without impairing the inherent characteristics of the PPS resin.

According to this invention, there is provided a block copolymer composed of polyphenylene sulfide segments and aromatic sulfide sulfone polymer segments and having a logarithmic viscosity [η] of 0.03 to 1.0, preferably 0.05 to 0.5, said logarithmic viscosity [η] being determined at 206° C. for its solution in alpha-chloronaphthalene in a polymer concentration of 0.4 g/100 ml of solution and calculated in accordance with the equation [η]=ln (relative viscosity)/polymer concentration.

The present invention also provides a composition for molding or for encapsulation of electronic component parts, said composition comprising the aforesaid block copolymer and polyphenylenesulfide and/or an aromatic sulfide sulfone polymer, and as required a filler.

The invention further provides a film prepared from the copolymer or the composition.

BRIEF DESCRIPTION OF THE DRAWING

The attached FIGURE illustrates a 16 pin IC lead frame encapsulated with various comparative or invention compositions with a portion of the encapsulating resin removed in accordance with an adhesion test.

The PPS segments constituting the block copolymer of this invention preferably contain at least 30 mole %, especially at least 70 mole %, of structural units represented by the general formula

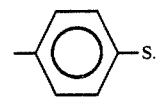

If the amount of the structural units is less than 30 mole %, it is difficult to obtain a block copolymer having excellent properties. Preferably, PPS has a logarithmic viscosity [η], as defined hereinabove, of 0.03 to 0.80.

This polymer can be produced, for example, by polymerizing a halogen-substituted aromatic compound such as p-dichlorobenzene in the presence of sulfur and sodium carbonate; polymerizing it in a polar solvent in the presence of a combination of sodium sulfide or sodium hydrosulfide and sodium hydroxide, a combination of hydrogen sulfide and sodium hydroxide, or a sodium aluminoalkanoate; or by self-condensing p-chlorothiophenol. One suitable method is to react p-dichlorobenzene with sodium sulfide in an amide solvent such as N-methylpyrrolidone or dimethylacetamide or a sulfone-type solvent such as sulfolane. Preferably, a carboxylic acid, a sulfonic acid, an alkali metal phosphate, or an alkali hydroxide may be added to regulate the degree of polymerization of the polymer. Copolymer components which will give a meta-linkage

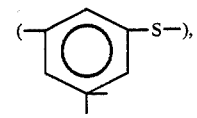

an ortho-linkage

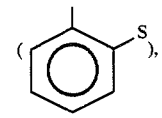

an ether linkage

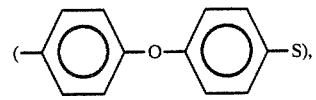

a sulfone linkage

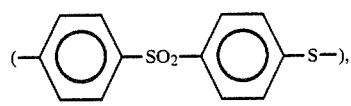

a biphenyl linkage

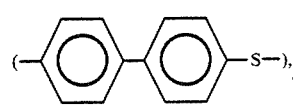

a substituted phenyl sulfide linkage

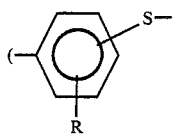

where R represents an alkyl group, a nitro group, a phenyl group, an alkoxy group, a carboxylic acid group or a metal carboxylate group), and a trifunctional linkage

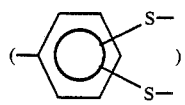

may be used in amounts which do not greatly affect the crystallinity of the polymer, for example in an amount of not more than 30 mole %. Preferably, the amount of the copolymer components is not more than 10 mole %. The amount of a copolymer component which gives a trifunctional or higher component such as a phenyl, biphenyl or naphthyl sulfide linkage is preferably not more than 3 mole %.

Specific methods of producing PPS include, for example, (1) reaction of a halogen-substituted aromatic compound with an alkali sulfide (see U.S. Pat. Nos. 2,513,188, 3,322,834, 3,354,129, and 3,919,177), (2) condensation of thiophenols in the presence of an alkaline catalyst or a copper salt (see U.S. Pat. No. 3,274,165 and British Pat. No. 1,160,660), and (3) condensation of an aromatic compound with sulfur chloride in the presence of a Lewis acid (see Japanese Pat. Publication No. 27255/1971 and Belgian Pat. No. 29437).

The block copolymer of the invention can be produced by reacting the terminal group of the aromatic sulfide sulfone polymer with the terminal group of PPS (for example, when the terminal group of the aromatic sulfide sulfone polymer is a chlorophenyl group of the formula

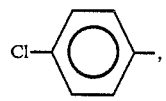

the terminal group of PPS is converted to a reactive group such as a sodium sulfide group of the formula NaS-, and then the two terminal groups are reacted), or by adding to one of PPS having a reactive terminal group and an aromatic sulfide sulfone polymer having a reactive terminal group a monomer constituting the other polymer, and polymerizing them to form a block copolymer. The PPS having a sodium sulfide group as the terminal group may, for example, be one which is obtained by reacting sodium sulfide in an amount in excess of the amount of the p-dichlorobenzene component by 1 to 20 mole % at the time of the polymerization reaction.

The aromatic sulfide sulfone polymer constituting the block copolymer of this invention is defined as a polymer having recurring units of the formula

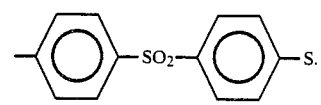

Preferably, this polymer has a logarithmic viscosity $\eta_{inh}$ of 0.05 to 1.0. The $\eta_{inh}$ is determined at 30° C. for a polymer solution in a 3:2 by weight mixture of phenol and 1,1,2,2-tetrachloroethane in a concentration of 0.5/100 ml of solution, and calculated in accordance the equation $\eta_{inh}=\ln$ (relative viscosity)/polymer concentration.

This polymer may, for example, be obtained by reacting a dihalogenated aromatic sulfone with an alkali metal sulfide in an organic amide solvent (see U.S. Pat. No. 4,102,875).

The aromatic sulfide sulfone polymer used in preparing the block copolymer of this invention is, for example, one having the group

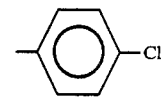

at the polymer terminal. It is obtained, for example, by reacting the dihalogenated aromatic sulfone in an excessive amount, for example, in 5 mole % excess, with regard to the alkali metal sulfide at the time of the polymerization (see U.S. Pat. No. 4,301,274).

In performing the copolymerization reaction of the aromatic sulfide sulfone polymer and PPS in the synthesis of the block copolymer of the invention, it is possible to add a binder such as a dihalogenated aromatic sulfone or sodium sulfide as a third component. It is also possible to polymerize a monomer constituting one of PPS and the sulfide sulfone polymer in the presence of the other polymer and finally obtain a copolymer within the definition of this invention.

Most preferably, in the block copolymerization reaction, the number of the terminal reactive groups of PPS is made equal to that of the aromatic sulfide sulfone polymer because it can afford the desired block copolymer in a good yield. If the number of the terminal groups of one component is in excess of that of the other, the desired block copolymer can be recovered by removing the unreacted homopolymer component after the reaction by fractionation or extraction.

The solvent used in the copolymerization reaction is preferably an organic polar solvent which is substantially liquid at the temperatures and pressures used in the reaction. Specific examples include amides, ureas and lactams such as formamide, acetamide, N-methylformamide, N,N-dimethylformamide, N,N-dimethylacetamide, 2-pyrrolidone, N-methyl-2-pyrrolidone, N-ethyl-2-pyrrolidone, epsilon-caprolactam, N-methyl-epsilon-caprolactam, hexamethylphosphoramide, tetramethylurea and 1,3-dimethyl-2-imidazolidinone; sulfones such as sulfolane and dimethylsulfolane; nitriles such as benzonitrile; ketones such as methylphenylketone; and mixtures of these. Among these solvents, aprotic organic polar solvents such as amides, lactams and sulfones are preferred. The amount of the organic polar solvent is 2 to 20, preferably 2 to 10, times the weight of the polymer components used.

The block copolymerization reaction product is a block copolymer of PPS and the aromatic sulfide sulfone polymer which are chemically bonded to each other. This is confirmed by the fact that when the resulting copolymer is repeatedly extracted with a 3:2 by weight mixed solvent of phenol and tetrachloroethane, which is a good solvent for the aromatic sulfide sulfone polyemer, the extracts do not contain the aromatic sulfide sulfone polymer. On the other hand, whether the copolymerization reaction product contains the unreacted PPS can be ascertained by subjecting the product to fractional precipitation with alpha-chloronaphthalene, a good solvent for PPS, and determining whether the PPS homopolymer is present in the precipitate.

The present invention further provides a resin composition comprising the aforesaid block copolymer and PPS and/or an aromatic sulfide sulfone polymer, and optionally a filler.

A resin composition in accordance with this invention which comprises 3 to 100 parts by weight, preferably 10 to 100 parts by weight, of the block copolymer and 1 to 97 parts by weight, preferably 10 to 90 parts by weight, of PPS and/or 1 to 60 parts by weight, preferably 10 to 40 parts by weight, of the aromatic sulfide sulfone polymer has greatly improved impact strength and excellent compatibility.

One example of the resin composition in accordance with this invention is a resin mixture obtained by performing the above reaction of forming the block copolymer of the invention such that one of the PPS component and the aromatic sulfide sulfone polymer component is used in an excessive amount. The presence of the free aromatic sulfide sulfone polymer in the resin mixture can be determined by repeatedly extracting the resin mixture with N-methylpyrrolidone or a mixture of phenol and tetrachloroethane which is a good solvent for the aromatic sulfide sulfone polymer. Whether the resin mixture contains the free PPS homopolymer can be ascertained by a fractional precipitation experiment using alpha-chloronaphthalene. The resin composition of this invention may, of course, be obtained by separately producing the block copolymer, PPS and the aromatic sulfide sulfone polymer, and mixing them with each other.

A filler may be incorporated in an amount of not more than 70% by weight in the block copolymer and the resin composition in order to improve properties required of engineering plastics, such as strength, thermal resistance and dimensional stability. Specific examples of the filler include fibrous reinforcing agents such as glass fibers, carbon fibers, potassium titanate, asbestos, silicon carbide, ceramic fibers, metal fibers and silicon nitride; inorganic fillers such as barium sulfate, calcium sulfate, kaolin, clay, pyrophyllite, bentonite, sericite, zeolite, mica, nepheline syenite, talc, attapulgite, wollastonite, PMF, ferrite, calcium silicate, calcium carbonate, magnesium carbonate, dolomite, antimony trioxide, zinc oxide, titanium dioxide, magnesium oxide, iron oxide, molybdenum dioxide, graphite, lithium carbonate, gypsum, glass beads, glass flakes, glass balloons and quartz powder; and organic reinforcing agents such as aramide fibers.

Additives effective for thermal stability, such as carbodiimide compounds and compounds having a benzotriazole or imidazole group, may be added to the resin composition of this invention.

Within the objectives of this invention, another polymeric material may be incorporated in the block copolymer and resin composition of this invention. Examples of the other polymeric material are thermoplastic resins such as polyphenylene oxide, polyarylates, polyamides, polybutylene terephthalate, polyether ether ketone, polyimides, polyetherimides, polyethersulfones, other polysulfones, polycarbonates and liquid crystal polymers such as wholly aromatic polyesters; epoxy resins such as novolak-type epoxy resin; polyolefins such as polyethylene and polypropylene; alpha-olefin copolymers such as maleic acid-modified polypropylene; and thermoplastic elastomers such as nylon 11/polyether polyamide elastomer and hydrogenated conjugated diene/styrene copolymers.

The block copolymer and the resin composition provided by this invention can be used not only in producing injection-molded articles and compression-molded articles as electrical and electronic component parts which are the principal uses of the conventional PPS, but also in extruded articles such as fibers, sheets, films and tubes, blow-molded articles and transfer molded articles.

Above all, a resin composition comprising the block copolymer or a mixture of the block copolymer and PPS and/or a polysulfone polymer, and an inorganic filler and having a melt viscosity, measured at 320° C. (orifice: 1 mm in diameter and 2 mm in length; load 10 kg), of 200 to 2,000 poises is useful for encapsulation of electronic component parts.

The block copolymer, PPS and the inorganic filler in the above composition may be those described hereinabove. As the polysulfone polymer, there can be used, for example, an aromatic sulfide sulfone polymer, a polysulfone polymer having the recurring units of the formula

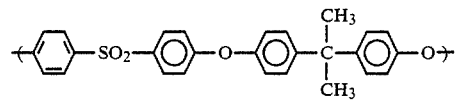

a polyethersulfone polymer having the recurring units of the formula

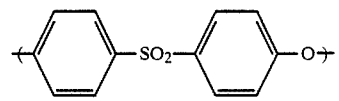

and a polyarylsulfone polymer having the recurring units of the formula

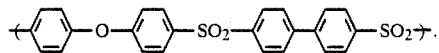

For encapsulation of electronic component parts, the resin composition generally comprises 100 parts by weight of the block copolymer, not more than 50,000 parts by weight of the polyphenylene sulfide polymer and not more than 10,000 parts by weight of the polysulfone polymer. Preferably, the inorganic filler is incorporated in an amount of 30 to 75% by weight in the encapsulating resin composition. If it exceeds 75% by weight, the melt viscosity of the resulting composition becomes high. If it is less than 30% by weight, the strength and thermal resistance of the composition are unsatisfactory.

The encapsulating resin composition should have such a melt viscosity which does not injure electronic component parts. The preferred range of the melt viscosity is 200 to 2,000 poises (orifice: 1 mm in diameter and 2 mm in length; load 10 kg) at 320° C. If the melt viscosity exceeds 2,000, the resin composition exerts a high stress on the electronic component parts. If it is below 200 poises, the molecular weight of the resin component should be drastically reduced and the resin composition has a much reduced strength.

Suitable amounts of known additives, such as silane coupling agents, titanate coupling agents, rubbers, elastomers, heat stabilizers, antioxidants, corrosion inhibitors, flowability improvers and coloring agents may be added to the resin composition for encapsulation of electronic component parts.

The block copolymer of the invention and the resin composition containing the block copolymer differ from PPS homopolymer and the aromatic sulfide sulfone homopolymer and a mere blend of both, but as a result of block copolymerization, PPS segments are linked to the aromatic sulfide sulfone polymer segments. Hence, they are excellent in mechanical properties such as flexural strength and impact strength, and have excellent compatibility with PPS and other polymers.

The resin composition of the invention designed for encapsulation of electronic component parts contributes to an increase in the performance and reliability of encapsulated electronic component parts because it has improved toughness, adhesion to metals and flowability characteristics over a known encapsulating resin composition comprising only a polyphenylene sulfide resin as a resin component.

The following examples illustrate the present invention more specifically. It should be understood however that the invention is not limited to them alone.

EXAMPLE 1 AND COMPARATIVE EXAMPLES 1 AND 2

(A) An aromatic sulfide sulfone polymer having a terminal chlorophenyl group (PPSS for short) was synthesized by the following procedure.

A 10-liter autoclave was charged with 1980 g of N-methylpyrrolidone, 655 g (5.0 moles) of sodium sulfide 2.7-hydrate, 2.0 g of sodium hydroxide, and 1436 g (5.0 moles) of bis(p-chlorophenyl)sulfone, and in an atmosphere of nitrogen, the materials were heated to 200° C., and maintained at this temperature for 6 hours with stirring. Then, a solution of 72 g (0.25 mole) of bis(p-chlorophenyl)sulfone in 200 g of N-methylpyrrolidone was added to the reaction mixture, and reacted for 1 hour. The reactor was cooled, and the reaction mixture was taken out. It was washed several times with hot water and acetone, and the polymer cake was separated by filtration. The cake was dried under reduced pressure at 80° to 150° C. to give 1190 g (yield 96%) of a pale brown polymer. The polymer had a logarithmic viscosity $\eta_{inh}$, determined at 30° C. for its solution in a 3:2 by weight mixture of phenol and 1,1,2,2-tetrachloroethane in a concentration of 0.5 g/100 ml of solution and calculated by the equation $\eta_{inh} = \ln$ (relative viscosity)/polymer concentration, of 0.22.

(B) PPS having a terminal sodium sulfide group was synthesized by the following procedure.

A 10-liter autoclave was charged with 3100 g of N-methylpyrrolidone, 1009 g (7.7 moles) of sodium sulfide 2.7-hydrate and 3.5 g (0.09 mole) of sodium hydroxide, and in an atmosphere of nitrogen, the materials were heated to 200° C. over the course of about 2 hours to distill 220 ml of water. The reaction mixture was cooled to 150° C., and then 1029 g (7.0 moles) of p-dichlorobenzene and 700 g of N-methylpyrrolidone were added and reacted at 230° C. for 1.5 hours and then at 260° C. for 2 hours. After the polymerization, the pressure of the inside of the autoclave was 7.0 kg/cm². The reactor was cooled, and a part of the reaction mixture was sampled and filtered. The resulting cake was washed with boiling water three times, and then further with acetone twice. The washed product was dried at 120° C. to give a PPS polymer as a pale grayish brown powder (yield about 94%). The polymer had a logarithmic viscosity $[\eta]$ [determined at 206° C. for its solution in alpha-chloronaphthalene in a concentration of 0.4 g/100 ml and calculated by the equation $[\eta] = \ln$ (relative viscosity)/polymer concentration of 0.14.

(C) Subsequently, 2370 g of the reaction mixture after the polymerization to form PPS, 300 g of PPSS having a terminal chlorophenyl group and 1200 g of N-methylpyrrolidone were added, and after purging with nitrogen, the reactor was sealed up. The temperature was raised to 220° C., and the reaction was carried out at this temperature for 3 hours. The reactor was cooled, and the reaction mixture was separated by filtration. The solid collected was washed twice with N-methylpyrrolidone and then thrice with boiling water. The cake obtained was dried at 120° C. for 5 hours and dispersed in a 3:2 by wight mixture of phenol and 1,1,2,2-tetrachloroethane. The unreacted PPSS was thus removed by extraction at 100° C. It was confirmed that after repeating this extracting operation three times, no PPSS was further extracted. After the extraction, the resultant cake was fully washed with acetone, and then dried. It was dissolved in alpha-chloronaphthalene at 210° C. and subjected to fractional precipitation. The unreacted PPS alone was separate and removed by filtration. The resulting cake was fully washed with acetone, and dried at 120° C. for 5 hours to give 486 g of a polymer as a pale brown powder having an $[\eta]$ of 0.19.

The infrared absorption spectrum of the polymer measured did not show peaks other than peaks ascribable to the absorptions of PPS and PPSS. PPSS was quantitatively determined from the intensities of the characteristic absorptions observed at 1320 cm$^{-1}$, 620 cm$^{-1}$ and 480 cm$^{-1}$. It was found that the polymer contained 46.0% by weight of PPSS. By elemental analysis, the polymer was found to contain 27.87% of sulfur. It was thus confirmed that the polymer contained 46.0% by weight of PPSS.

Separately, a blend of PPS and 46.0% by weight of PPSS was subjected to the same extraction experiment with the phenol/tetrachloroethane mixed solvent and to the fractional precipitation operation with alpha-chloronaphthalene. PPS and PPSS could be completely separated and recovered.

The copolymer product obtained was also analyzed by a differential scanning calorimeter (DSC). A crystallization peak was observed at 192° C. during cooling after melting. It was found from this result that this product retained crystallinity attributed to the PPS segments.

These results led to the determination that the copolymerization product was a block copolymer in which PPS and PPSS were chemically bonded to each other.

The block copolymer obtained in this example was heat-treated at 260° C. for 5 hours, and kneaded and pelletized by a twin-screw extruder with a cylinder diameter of 30 mm. The resulting pellets were injection-molded at 330° C. to prepare test pieces. The melt flow index (abbreviated MI value), the flexural strength and the Izod impact strength of the test pieces were measured in accordance with the methods of ASTM D-1238 (315° C., 5 kg load), ASTM D-790, and ASTM D-256, respectively. The compatibility was observed with the naked eyes. The peeled state of the molded article was determined by applying an adhesive tape to the fractured surface of the test piece, then removing the tape, and observing the state of the fractured surface with the naked eye.

In Comparative Example 1, a mixture with a PPSS content of 46.0% of PPSS synthesized in the above example and PPS powder obtained by the above treatment after PSS polymerization was subjected to the same test as above.

In Comparative Example 2, the PPS powder alone obtained by the method of the above example was tested as above.

The results are shown in Table 1.

TABLE 1

| Properties | Example 1 PPS/PPSS block copolymer | Comparative Example 1 PPS/PPSS mixture | Comparative Example 2 PPS |
|---|---|---|---|
| MI value (g/10 min.) | 58 | 96 | 104 |
| Flexural strength (kg/cm$^2$) | 750 | 440 | 310 |
| Izod impact strength (unnotched; kg-cm/cm) | 14.0 | 5.6 | 1.5 |
| Compatibility | good | poor | — |
| Peeling of the molded article | no | yes | — |

As seen from Table 1, the block copolymer has a lower MI value than the PPS or the PPS/PPSS mixture, and this shows an increase in melt viscosity owing to the block copolymerization. From the appearance and the peeled state of the molded article, it is presumed that the copolymer had good dispersibilty, and microphase separation occurred. The block copolymer had much increased flexural strength and impact strength over the polymer mixture, and this shows that the block copolymer had improved impact strength.

EXAMPLE 2 AND COMPARATIVE EXAMPLE 3

A PPS polymerization mixture having a terminal sodium sulfide group was synthesized as in Example 1 except that 1008 g (7.0 moles) of sodium benzoate was added together with sodium sulfide. A part of the product was sampled, and its $[\eta]$ was measured and found to be 0.31.

210 g of PPSS having a terminal chlorophenyl group ($\eta_{inh}$=0.29) synthesized as in Example 1 except that 330 g (5.0 moles) of lithium acetate was added at the time of charging the monomer, a portion (2860 g) of the PPS polymerization mixture obtained above, and 800 g of N-methylpyrrolidone were mixed in a reactor. After purging with nitrogen, the reactor was sealed, and the temperature was raised to 220° C. The reaction was carried out at this temperature for 3 hours. The reaction mixture was worked up as in Example 1 to remove the unreacted PPS and PPSS. Finally, 398 g of a grayish brown granular polymer was obtained. The polymer had a logarithmic viscosity $[\eta]$ of 0.34, and by infrared absorption spectroscopy, contained 31.5% by weight of PPSS.

Test pieces were prepared by pelletizing the polymer and injection-molding the pellets. The properties of the polymer were measured by using these test pieces. As Comparative Example 3, a mixture of PPSS and PPS synthesized in the above example with a PPSS content of 31.5% by weight was subjected to the same test.

The results are shown in Table 2. As in Example 1, the copolymer obtained in this example had much incresed impact strength and flexural strength over the mixture and showed improved impact strength.

EXAMPLE 3

PPS ($[\eta]$=0.13) synthesized by a method similar to that in Example 1 and PPSS ($\eta_{inh}$=28) having a terminal chlorophenyl group synthesized by a method similar to that in Example 1 were copolymerized by a method similar to that in Example 1. Finally, a powdery block copolymer having an $[\eta]$ of 0.15 and containing 69.0% by weight of PPSS was obtained. A crystallization peak by DSC of the copolymer was observed at 180° C. This shows that the copolymer retained crystallinity attributed to the PPS segments.

The properties of the copolymer were measured as in Example 1, and the results are shown in Table 2. The copolymer obtained in this invention having a large PPSS content also had improved impact strength.

TABLE 2

| Properties | Example 2 PPS/PPSS block copolymer | Comparative Example 3 PPS/PPSS mixture | Example 3 PPS/PPSS block copolymer |
|---|---|---|---|
| MI value (g/10 min.) | 18 | 43 | 35 |
| Flexural strength (kg/cm$^2$) | 1070 | 780 | 780 |
| Izod impact strength (unnotched; kg-cm/cm) | 17.6 | 9.3 | 18.2 |
| Compatibility | good | poor | good |
| Peeling of the molded article | no | yes | no |

EXAMPLE 4 AND COMPARATIVE EXAMPLES 4 AND 5

The block copolymer obtained in Example 1 was heat-treated at 260° C. for 7 hours, and 50 parts by weight of the heat-treated block copolymer was mixed with 50 parts of PPS (RYTON P-4, a product of Phillips Petroleum Co., U.S.A.). The mixture was kneaded under heat by a twin-screw extruder having a cylinder diameter of 30 mm to form pellets. The pellets were injection-molded at 330° C. to prepare test pieces. The properties of the copolymer given in Table 3 were measured as in Example 1 using the resulting test pieces.

In Comparative Example 4, a mixture of 50 parts by weight of a mixture of 48.0% by weight of PPSS and PPS synthesized in the above example and 50 parts by weight of RYTON P-4 was tested in the same way as above.

In Comparative Example 5, PPS powder obtained as in the above example was tested in the same way as above.

The results are shown in Table 3.

TABLE 3

| Properties | Example 4 PPS/PPSS block copolymer | Comparative Example 4 PPS/PPSS mixture | Comparative Example 5 PPS |
|---|---|---|---|
| MI value (g/10 min.) | 63 | 90 | 102 |
| Flexural strength (kg/cm$^2$) | 750 | 370 | 310 |
| Izod impact strength (unnotched; kg-cm/cm) | 7.0 | 2.3 | 1.5 |
| Compatibility | good | poor | — |
| Peeling of the molded article | no | yes | — |

It is seen from Table 3 that the composition of this invention has a lower MI value than a composition containing PPS or the PPS/PPSS mixture, and this shows that the melt viscosity increased owing to the inclusion of the block copolymer. From the appearance and the peeled state of the molded article, it is presumed that the block copolymer had good dispersibility and microphase separation occurred. Accordingly, the composition of this invention had much increased flexural strength and impact strength over the mixture, and showed improved impact strength.

Example 5

The block copolymer obtained in Example 1 was heat-treated at 260° C. for 7 hours, and 80 parts by weight of the heat-treated block copolymer was mixed with 20 parts by weight of PPSS synthesized in Example 1. The mixture was pelletized and injection-molded to form test pieces. The properties of the mixture were measured using these test pieces. The results are shown in Table 4.

EXAMPLE 6

A PPS polymer having a terminal sodium sulfide group was synthesized as in Example 1 except that 1629 g (8.0 moles) of sodium p-toluenesulfonate was added together with sodium sulfide. A part of the polymer was sampled, and its [η] was measured and found to be 0.31.

A portion (3740 g) of the polymerization mixture was mixed with 210 g of PPSS ($\eta_{inh}$=0.26) having a terminal chlorophenyl group synthesized as in Example 1 and 800 g of N-methylpyrrolidone in a reactor. After purging with nitrogen, the reactor was sealed and heated to 220° C. The reaction was carried out at this temperature for 3 hours. The reaction mixture was worked up as in Example 1 to obtain a grayish brown powdery polymer having an [η] of 0.34. Infrared absorption spectroscopy showed that this polymer contained 28.5% by weight of PPSS. When the polymer was subjected to the extraction experiment described in Example 1, PPS and PPSS homopolymers were hardly recovered. This led to the confirmation that the polymer obtained in this example was substantially a block copolymer.

Twenty parts by weight of the copolymer was mixed with 68 parts by weight of PPS (RYTON P-4) and 12 parts by weight of PPSS obtained in the above example. The mixture was tested as in Example 4. The results are shown in Table 4.

EXAMPLE 7 AND COMPARATIVE EXAMPLE 6

The block copolymer obtained in Example 1 was heat-treated at 260° C. for 7 hours. The heat-treated copolymer (24 parts by weight) was mixed with 36 parts by weight of PPS (RYTON P-4) and 40 parts of commercial glass fibers (OS-03MKA419, made by Asahi Fiberglass Co.). The mixture was kneaded under heat and pelletized in a twin-screw extruder, and then injection-molded at 330° C. to form test pieces.

In Comparative Example 6, a mixture was prepared as above except that a mixture of PPS and 18.4% by weight of PPSS obtained in Example 1 was used instead of the resin component in the above example. The resin mixture was tested in the same way.

The results are shown in Table 4. The copolymer composition of this invention which contained glass fibers also showed good results in flexural strength and impact strength.

EXAMPLE 8

PPSS ($\eta_{inh}$=0.51) having a terminal chlorophenyl group was synthesized in the same way as in Example 1 using equimolar proportions of lithium acetate dihydrate and sodium sulfide as a polymerization catalyst. Separately, PPS polymer having a terminal sodium sulfide group was synthesized as in Example 1 except that an equimolar proportion of sodium acetate was added together with sodium sulfide. The [η] of the PPS polymerization mixture, measured on a portion of it sampled, was 0.30. A powdery polymer having an [η] of 0.39 was prepared by copolymerizing a part of this polymerization mixture and PPSS. This polymer was a composition composed of 46% by weight of the PPS/PPSS block copolymer component and 54% by weight of the PPS component.

The copolymer composition was pelletized and injection-molded to prepare test pieces. The properties of the test pieces were measured.

The results are shown in Table 4.

EXAMPLE 9

Forty parts by weight of the copolymer composition obtained in Example 8 was mixed with 30 parts by weight of commercial glass fibers and 30 parts by weight of calcium carbonate. The mixture was molded as in Example 8 to form test pieces, and the properties of the test pieces were measured. The results are shown in Table 4.

TABLE 4

| Properties | Example 5 PPS/PPSS block copolymer composition | Example 6 PPS/PPSS block copolymer composition | Example 7 PPS/PPSS block copolymer composition (60) + glass fibers (40) | Comp. Example 6 PPS/PPSS mixture (60) + glass fibers (40) | Example 8 PPS/PPSS block copolymer composition | Example 9 PPS/PPSS block copolymer (40) + glass fibers (30) + CaCO$_3$ (30) |
|---|---|---|---|---|---|---|
| MI value (g/10 min.) | 35 | 63 | 28 | 40 | 21 | 11 |
| Flexural strength (kg/cm$^2$) | 910 | 670 | 1760 | 1200 | 1050 | 1420 |
| Izod impact strength (unnotched, kg-cm/cm) | 11.8 | 8.2 | 25.0 | 15.6 | 18.1 | 17.3 |

TABLE 4-continued

| Properties | Resin composition | | | | | |
|---|---|---|---|---|---|---|
| | Example 5 PPS/PPSS block copolymer composition | Example 6 PPS/PPSS block copolymer composition | Example 7 PPS/PPSS block copolymer composition (60) + glass fibers (40) | Comp. Example 6 PPS/PPSS mixture (60) + glass fibers (40) | Example 8 PPS/PPSS block copolymer composition | Example 9 PPS/PPSS block copolymer (40) + glass fibers (30) + CaCO₃ (30) |
| Compatibility | Good | Good | Good | Poor | Good | Good |
| Peeling of the molded article | No | No | No | Yes | No | No |

EXAMPLE 10

The block copolymer obtained in Example 8 was formed into a sheet at 310° C., and quenched in water to form a transparent unstretched sheet having a thickness of 420 micrometers. The unstretched sheet was then simultaneously stretched in two directions at 130° C. at a stretch ratio of 3.5 in each direction. The resulting film was heat-set under tension at 230° C. for 2 minutes, and its properties were measured. The results are shown in Table 5.

EXAMPLE 11

Example 10 was repeated except that instead of the block copolymer, there was used a mixture with a PPSS content of 23% by weight of the block copolymer synthesized in Example 8 and PPS polymer having an $[\eta]$ of 0.31 obtained by the above treatment after PPS polymerization. The results are shown in Table 5.

COMPARATIVE EXAMPLE 7

Example 10 was repeated except that instead of the block copolymer, there was used a mixture with a PPSS content of 23% by weight of the PPSS having a terminal chlorine obtained by Example 8 and PPS polymer having an $[\eta]$ of 0.31 obtained by the aforesaid treatment after PPS polymerization. The results are shown in Table 5.

COMPARATIVE EXAMPLE 8

Comparative Example 7 was repeated except that the PPS powder used in Comparative Example 7 was used alone instead of the mixture used in Comparative Example 7. The results are shown in Table 5.

TABLE 5

| | Example 10 | Example 11 | Comp. Example 7 | Comp. Example 8 |
|---|---|---|---|---|
| Amounts (parts by weight) | | | | |
| Block copolymer | 100 | 50 | 0 | 0 |
| PPS | 0 | 50 | 77 | 100 |
| PPSS | 0 | 0 | 23 | 0 |
| PPSS content (wt. %) | 46 | 23 | 23 | 0 |
| Film properties | | | | |
| Uniformity | | | X(*) | |
| Density (g/cm³) | 1.42 | 1.39 | 1.38 | 1.36 |
| Tensile strength (kg/mm²) | 12.9 | 12.8 | — | 13.0 |
| Elongation (%) | 100 | 84 | — | 45 |
| Tear strength (g) | 160 | 100 | — | 18 |

(*)A homogeneous film could not be formed because of poor compatibility.

In Table 5, the properties were measured by the following methods.

(1) Density

The density was measured by a density gradient tube using an aqueous solution of lithium bromide.

(2) Tensile test

A sample of the film after heat-setting was cut into a piece having a width of 5 mm and a length of 100 to 150 mm, and its break strength (tensile strength) and elongation were measured. In the tensile test, a Tensilon tensile tester was used, and the sample was held by a clip so that the sample length became 50 mm. The sample was stretched at a tensile speed of 200 %/min. At this time, the sample was maintained at a temperature of 23° C.

(3) Tear strength

Measured in accordance with the method of JIS P8116-1976.

EXAMPLES 12 TO 17 AND COMPARATIVE EXAMPLES 9 AND 10

PPSS/PPS ($\eta$=0.12) block copolymers ($[\eta]$=about 0.12) were prepared by the same synthesizing method as in Example 1 so that the weight proportion of the PPSS segments ($\eta_{inh}$=0.13) was as shown in Table 6.

One hundred parts by weight of each of these block copolymers was mixed with polyphenylene sulfide, an inorganic filler and an additive in the amounts indicated in Table 6. The mixture was melt-kneaded at 320° C. and pelletized in an extruder having a cylinder diameter of 65 mm.

A 16 pin IC lead frame [42 alloy (iron-nickel alloy), 0.25 mm thick] was encapsulated using the resulting pellets. The encapsulated article (6.2 mm × 19.0 mm) was boiled in red ink, and the adhesion of the resin composition to the metal was evaluated on the basis of the degree of penetration of red ink twenty hours later. This evaluation was effected by the following procedure with reference to the accompanying drawing.

As shown in the drawing, the resin composition at the right top portion of the molded article was peeled off, and it was determined which areas 1 to 7 of the topmost lead were dyed with the red ink. In the drawing, the reference numeral 1 represents the encapsulated lead frame; 2, an island; 3, a molded portion prepared from the resin composition; 4, leads.

The toughness of the pellets was evaluated by measuring the Izod impact strength (unnotched) in accordance with ASTM D256.

The results are summarized in Table 6.

TABLE 6

| Example (Ex.) or Comparative Example (CEx.) | CEx. 9 | Ex. 12 | Ex. 13 | Ex. 14 | Ex. 15 | Ex. 16 | Ex. 17 | CEx. 10 |
|---|---|---|---|---|---|---|---|---|
| PPSS in the copolymer (wt. %) | 0 | 5 | 10 | 20 | 40 | 80 | 80 | 0 |

TABLE 6-continued

| Example (Ex.) or Comparative Example (CEx.) | | CEx. 9 | Ex. 12 | Ex. 13 | Ex. 14 | Ex. 15 | Ex. 16 | Ex. 17 | CEx. 10 |
|---|---|---|---|---|---|---|---|---|---|
| PPS | [η] | — | — | — | — | 0.12 | 0.12 | 0.12 | 0.12 |
|  | Parts by weight |  |  |  |  | 300 | 4900 | 4900 | 5000 |
| Inorganic filler | Type | fused silica (10μ) | fused silica (10μ) | fused silica (10μ) | glass beads | glass fibers (120μ) | glass fibers (150μ) | glass fibers (150μ) | glass fibers (150μ) |
|  | Amount (parts by weight) | 180 | 180 | 180 | 90 | 320 | 5000 | 5000 | 5000 |
|  | Type | — | — | — | glass fibers (40μ) | fused silica (30μ) | — | — | — |
|  | Amount (parts by weight) |  |  |  | 20 | 320 |  |  |  |
| Additive | Type | — | — | — | β-(3,4-epoxy-cyclohexyl)-trimethoxy-silane | — | — | γ-chloro-propyltri-methoxy-silane | γ-chloro-propyltri-methoxy-silane |
|  | Amount (parts by weight) |  |  |  | 0.2 |  |  | 1 | 1 |
| Melt viscosity at 320° C. (poises) |  | 400 | 520 | 600 | 620 | 980 | 500 | 470 | 450 |
| Degree of penetration of red ink |  | 7 | 3 | 2 | 1 | 2 | 4 | 4 | 7 |
| Izod impact strength (kg-cm/cm) |  | 2 | 4 | 7 | 10 | 9 | 6 | 5 | 3 |

EXAMPLE 18

4500 Parts by weight of PPS having an [η] of 0.12, 500 parts by weight of polysulfone having an $\eta_{inh}$ of 0.28 (P-1700, a product of Union Carbide Corporation), 100 parts by weight of a block copolymer having an [η] of 0.14 containing 50% by weight of PPSS segments synthesized as in Example 11, and 6000 parts by weight of fused silica beads were melt-kneaded at 360° C. in an extruder having a cylinder diameter of 65 mm to form pellets. The properties of the pellets were evaluated as in Examples 12 to 17. The degree of red ink penetration was 1 , and the Izod impact strength (unnotched) was 8 kg-cm/cm.

COMPARATIVE EXAMPLE 11

Example 18 was repeated except that the block copolymer was not used. The resulting product had a red ink penetration degree of 3 and an Izod impact strength (unnotched) of as low as 2 kg-cm/cm.

EXAMPLE 19

When a 9 pin resistor was encapsulated by using the resin composition obtained in Example 13, the reliability of the encapsulated resistor was more than that obtained by a conventional epoxy resin encapsulation composition.

What we claim is:

1. A block copolymer composed of polyphenylene sulfide segments and aromatic sulfide sulfone polymer segments and having a logarithmic viscosity [η] of 0.03 to 1.0, said logarithmic viscosity [η] being determined at 206° C. for its solution in alpha-chloronaphthalene in a polymer concentration of 0.4 g/100 ml of solution and calculated in accordance with the equation [η]=ln (relative viscosity)/polymer concentration.

2. The copolymer of claim 1 wherein the polyphenylene sulfide segments are derived from a polymer having a logarithmic viscosity [η], defined in claim 1, of 0.03 to 0.80.

3. The copolymer of claim 1 wherein the aromatic sulfide sulfone polymer segments are derived from a polymer having a logarithmic viscosity $\eta_{inh}$, determined at 30° C. for its solution in a 3:2 by weight mixture of phenol and 1,1,2,2-tetrachloroethane in a concentration of 0.5 g/100 ml of solution and calculated by the equation $\eta_{inh}$=ln (relative viscosity)/polymer concentration, of 0.05 to 1.0.

4. The copolymer of claim 1 wherein the weight ratio of the polyphenylensulfide segments to the aromatic sulfide sulfone polymer segments are 1-99/99-1.

5. The copolymer of claim 1 which has a logarithmic vicosity [η] of 0.05 to 0.5.

6. A molded article composed of the block copolymer of claim 1.

* * * * *